C. SANGSTER.
THILL-COUPLING.

No. 182,716.  Patented Sept. 26, 1876.

Witnesses,
F. P. Stiker
W. S. Grosvenor

Inventor,
Charles Sangster
By James Sangster
Atty.

UNITED STATES PATENT OFFICE.

CHARLES SANGSTER, OF BUFFALO, NEW YORK, ASSIGNOR TO WILLIAM S. GROSVENOR, JAMES SANGSTER, AND HUGH SANGSTER, OF SAME PLACE.

IMPROVEMENT IN THILL-COUPLINGS.

Specification forming part of Letters Patent No. 182,716, dated September 26, 1876; application filed December 8, 1875.

*To all whom it may concern:*

Be it known that I, CHARLES SANGSTER, of the city of Buffalo, in the county of Erie and State of New York, have invented certain new and useful Improvements in Carriage-Thill Couplings, which improvements are fully set forth in the following specification, reference being had to the accompanying drawings.

The object of this invention is to afford a convenient means for attaching or disconnecting the thills to or from a carriage, and at the same time hold them so securely in place that it will be impossible for them to be separated until the horses are released therefrom; and it consists of a connecting-piece, provided with one or two studs or projecting parts on each side, a rubber or other equivalent spring, having a metallic covering or other wearing-piece on the outside, in combination with a hollow coupling of peculiar shape to receive them, as will be more clearly hereinafter described.

Figure 1:
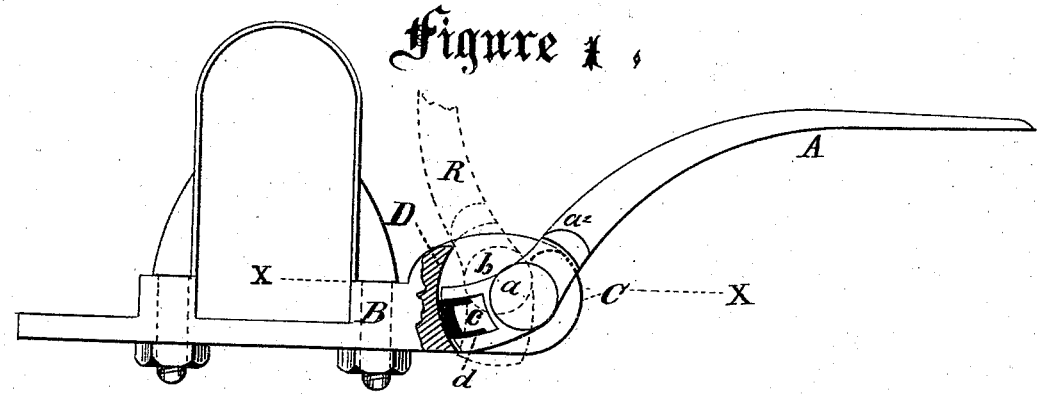
Figure 2:
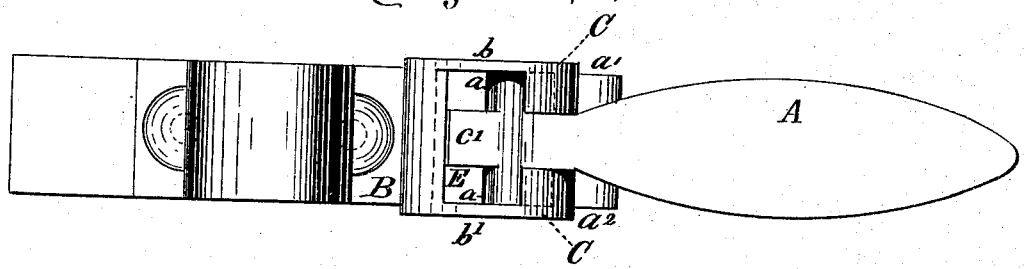
Figure 3:
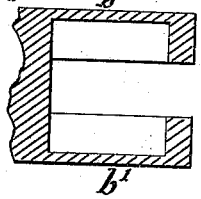

In the said drawings, Figure 1 is a side elevation in partial section; Fig. 2, a top view, and Fig. 3 represents a horizontal section through a portion of the coupling, through line X X, Fig. 1.

A represents the connecting-piece. It is provided with two projecting parts, $a\ a$; also two pieces, $a^1\ a^2$, and a rubber or other equivalent spring, $c$, having a metallic wearing-piece, $d$, inserted into or otherwise fastened to the part $c'$. B is a hollow fork-shaped holding-piece, for receiving the part A. It is formed like two hooks, as shown in Figs. 1 and 2, each inclosed on one side by the parts $b\ b'$. C C represent said hook-shaped portions. They are formed so as to receive and hold the parts $a\ a$. The curve of the back part D is a portion of a circle, having its center in the same point with $a\ a$. The remaining parts are similar to those in ordinary use for connecting the axle-tree of a carriage or wagon, and are so well known that they require no further description here.

The part A is connected to the piece B by inserting it while in a vertical position, as shown by the dotted lines R, Fig. 1, and then bringing it into a horizontal position, as shown in Fig. 1. The parts $a^1$, $a^2$, and $c'$ prevent it from being pushed back out from the hook-shaped parts C. The parts C prevent it from being drawn forward, and it is thereby held securely in place. The rubber spring $c$ prevents rattling, and the metallic cover $d$ takes the wear from the spring. A spiral or other metallic spring may be used in place of the rubber spring, if desired.

I claim as my invention—

The part A, having the projections $a\ a\ a^1\ a^2$, spring $c$, and wearing-plate $d$, in combination with the coupling-piece B, provided with the inclosed hook-shaped parts C and curved back portion D, all arranged substantially as and for the purposes described and shown.

CHARLES SANGSTER.

Witnesses:
F. P. STIKER,
WM. S. GROSVENOR.